G. FINKEN.
Making Cube Sugar.

No. 2,074, 33,078.

Patented Aug. 20, 1861.

Witnesses:

Inventor:

UNITED STATES PATENT OFFICE.

GUSTAVUS FINKEN, OF BROOKLYN, NEW YORK.

IMPROVEMENT IN APPARATUS FOR MANUFACTURING CUBE SUGAR.

Specification forming part of Letters Patent No. 33,078, dated August 20, 1861.

*To all whom it may concern:*

Be it known that I, GUSTAVUS FINKEN, of Brooklyn, in the county of Kings and State of New York, have invented certain new and useful Improvements in the Manufacture of Cube Sugar; and I do hereby declare that the following is a full, clear, and exact description of the same, reference being had to the accompanying drawings, forming part of this specification, in which—

Figure 1:
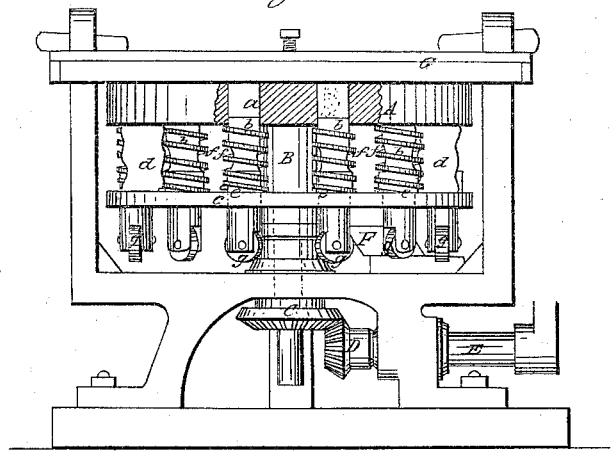
Figure 3:
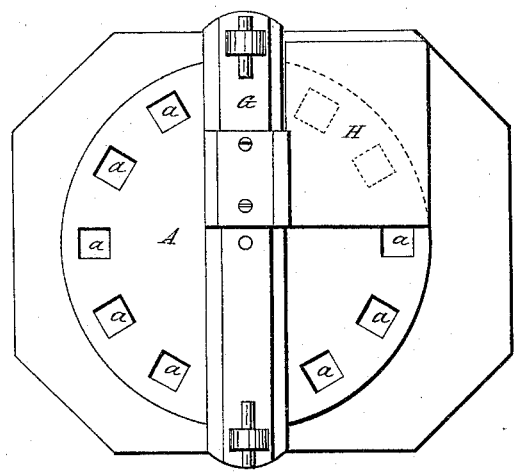
Figure 2:
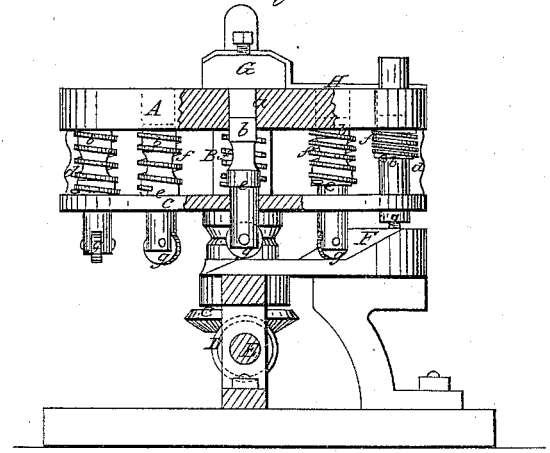

Figure 1 represents a sectional side elevation of my invention. Fig. 2 is a front elevation of the same, partly in section. Fig. 3 is a plan or top view of the same.

Similar letters of reference indicate corresponding parts in the several figures.

After manifold experiments I have succeeded in preparing the sugar, previous to putting it into the molds, by exposing it to a current of steam in such manner that the moisture and heat imparted to the same through the action of the steam give to the granules the quality to stick readily together, and when pressed to adhere firmly to each other, and to form into solid and substantial lumps that are not liable to fall to pieces on being handled or packed. Besides this, and in order to reduce the labor of forming the lumps, I employ a series of rising and falling pistons, operating in suitable cavities or molds in a rotary disk, and operated upon by a stationary cam in such manner that the sugar introduced into said molds is compressed at a certain point during the circuit of the disk, and the lumps thus formed are forced out and deposited on a stationary platform.

To enable those skilled in the art to fully understand and use my invention, I will proceed to describe it.

The granular sugar, before being introduced into the molds, is first exposed to a current of moist steam in such manner that the entire mass of sugar is uniformly heated and moistened. The steam employed may be at a pressure very slightly above that of the atmosphere, and the granular sugar may be exposed to its action by being allowed to fall through a screen down a trunk, which is filled with the steam. Thus prepared, the sugar is introduced into the cavities or molds $a$ by passing the same through a suitable sieve, so as to cause it to fill each mold in even and uniform layers. After the molds are filled, the sugar is compressed by the action of pistons or plungers $b$, which fit nicely into the molds, and which also serve to force the lumps out of the molds after they are ready pressed. The molds are arranged in a rotary disk, A, which is firmly secured to a vertical shaft, B, to which motion is imparted by a bevel-gear, C D, from a horizontal driving-shaft, E. Each mold is furnished with a piston or plunger, the upper ends of which fit nicely into the molds, while their lower ends or stems are guided by a plate, $c$, secured to the disk A by means of columns $d$, and shoulders $e$ prevent the pistons sinking down below the lower surface of the disk. Springs $f$, that are wound round the pistons, keep the shoulders $e$ in contact with the plate $c$ until the stems, by passing up on the stationary cam F, force the pistons up. The lower ends of said stems are furnished with friction-rollers $g$ to facilitate their motion on the surface of the cam, and said cam is placed in such a position that the pistons begin to rise just as they advance under the cross-bar G that extends across the disk A, close to its upper surface. As the pistons rise under this cross-bar, the sugar which is or may be in the molds is compressed, and after having passed said cross-bar, each piston rises up gradually by the action of the cam until its upper surface is flush with the upper surface of the disk, and the lump of sugar (which has been formed by the compression) is pushed up and deposited on a platform, H, the edge of which comes close down upon the surface of the disk.

Instead of the cros-bar G, a roller might be employed to lessen the friction of the working parts, and in practice the disk A will be made large enough to afford room for several rows of molds, so that by one revolution of the disk a great number of lumps of sugar are turned out. It is obvious that the form of the molds may be changed at pleasure, according to the shape it is desired to give to the lumps.

Having thus fully described my invention, what I claim as new, and desire to secure by Letters Patent, is—

The combination, in the manner and for the purpose herein shown and described, of the rotary-wheeled spring-pistons $b$ with the disk A and cam F.

GUSS. FINKEN.

Witnesses:
M. M. LIVINGSTON,
LEWIS A. TUCKER.